US006011824A

United States Patent [19]

Oikawa et al.

[11] Patent Number: 6,011,824

[45] **Date of Patent: *Jan. 4, 2000**

[54] SIGNAL-REPRODUCTION METHOD AND APPARATUS

[75] Inventors: Yoshiaki Oikawa; Kenzo Akagiri; Mitsuyuki Hatanaka, all of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,231

[22] Filed: Sep. 5, 1997

[30] Foreign Application Priority Data

Sep. 6, 1996 [JP] Japan .................................... 8-236242

[51] Int. Cl.[7] ...................................................... H04L 23/00

[52] U.S. Cl. ........................... 375/377; 704/203; 704/205

[58] Field of Search ..................................... 375/346, 348, 375/350, 260, 285, 259, 377; 381/94, 71, 337; 364/725.01, 725.03, 724.011; 704/205–209, 223, 229, 203; 708/300, 400, 402

[56] References Cited

U.S. PATENT DOCUMENTS

| | | | |
|---|---|---|---|
| 4,914,749 | 4/1990 | Mitome | 381/41 |
| 5,040,217 | 8/1991 | Brandenburg et al. | 381/47 |
| 5,115,240 | 5/1992 | Fujiwara et al. | 341/51 |
| 5,197,087 | 3/1993 | Iwahashi et al. | 375/122 |
| 5,375,189 | 12/1994 | Tsutsui | 395/2.38 |
| 5,381,143 | 1/1995 | Shimoyoshi et al. | 341/51 |
| 5,461,378 | 10/1995 | Shimoyoshi et al. | 341/51 |
| 5,490,130 | 2/1996 | Akagiri | 369/124 |
| 5,502,789 | 3/1996 | Akagiri | 395/2.13 |
| 5,521,713 | 5/1996 | Oikawa | 358/335 |
| 5,680,130 | 10/1997 | Tsutsui et al. | 341/87 |
| 5,687,157 | 11/1997 | Imai et al. | 369/124 |
| 5,825,979 | 10/1998 | Tsutsui et al. | 395/2.91 |

OTHER PUBLICATIONS

M. Krasner, "The Critical Band Coder—Digital Encoding of Speech Signals Based on the Perceptual Requirements of the Auditory System," IEEE, vol. 1–3, Apr. 1980, pp. 327–331.

R. Zelinski et al., "Adaptive Transform Coding of Speech Signals," IEEE Transactions on Acoustices, Speech & Signal Processing, vol. ASSP-25, No. 4, Aug. 1977, pp. 299–309.

J. Princen et al., "Subband/Transform Coding Using Filter Bank Designs Based on Time Domain Aliasing Cancellation," ICASSP Apr. 6–9, 1987, IEEE, vol. 4, pp. 2161–2164.

*Primary Examiner*—Chi H. Pham
*Assistant Examiner*—Jean B Corrielus
*Attorney, Agent, or Firm*—Limbach & Limbach, L.L.P.

[57] ABSTRACT

Signal-reproduction method and apparatus receive a code string formed by coding a frequency-axial spectral signal obtained by performing the spectral transformation of a time-axial acoustic-waveform signal, and decode the received code string. Subsequently, the method and apparatus reproduce the acoustic-waveform signal by extracting part of the spectral signal, and performing the reverse-spectral-transformation of the extracted part.

18 Claims, 7 Drawing Sheets

SIGNAL-REPRODUCTION METHOD AND APPARATUS

BACKGROUND OF THE INVENTION

1. Field of the Invention

The present invention relates to signal-reproduction methods and apparatuses, and in particular, to signal-reproduction method and apparatus which receive a code string obtained by coding an input signal such as digital data, and use a simplified structure to reproduce the code string.

2. Description of the Related Art

Various techniques and apparatuses for the highly efficient coding of audio signals have been proposed. For example, there is a known transformation-coding method which has the steps of: separating a time-axial signal into frames in units of a predetermined time; performing the transformation (spectral transformation) of the time-axial signal in each frame to a frequency-axial signal; dividing the frequency band of the obtained spectral signal into a plurality of frequency bands; and coding the spectral signal in each band.

Types of the mentioned spectral transformation include, for example, a spectral transformation which separates an input audio signal into frames in units of a predetermined time, and transforms a time-axial value to a frequency-axial value by performing in each frame a discrete Fourier transform (DFT), a discrete cosine transform (DCT), or a modified discrete cosine transform (MDCT). Concerning the MDCT, details are described in a document titled "Subband/Transform Coding Using Filter Bank Designs based on Time Domain Aliasing Cancellation" (J. P. Princen, A. B. Bradley, Univ. of Surrey Royal Melbourne Inst. of Tech. ICASSP 1987).

In the above-described spectral transformation, by quantizing a signal divided in each band, a band in which a quantization noise occurs can be controlled, and a so-called masking effect is used to enable highly efficient coding for the sense of hearing. In addition, before performing quantization, by performing normalization in each band with the absolute values of signal components in the band, more highly efficient coding can be performed.

A band width in which human auditory characteristics are considered is often used as the divided width of a frequency band. That is, in general, in a band width called a "critical band" where a higher range has a wider band width, an audio signal is often divided into a plurality of bands (e.g., 25 bands). When data in each band at this time is coded, predetermined bit distribution is performed for each band, or bit allocation is adaptively performed for each band. By way of example, when coefficient data obtained by performing the MDCT is coded by performing the bit allocation, MDCT coefficient data in each band, obtained by performing MDCT for each frame, is coded using the number of adaptive allocation bits.

Techniques for the bit distribution include the following two known techniques.

For example, according to a document titled "Adaptive Transform Coding of Speech Signals" (R. Zelinski, P. Noll, IEEE Transactions of Acoustics, Speech, and Signal Processing, vol. ASSP-25, No. 4, Aug. 1997), bit allocation is performed based on the magnitude of a signal in each band. This technique flattens a quantization-noise spectrum to minimize the energy of a noise. However, the actual sense of hearing for the noise is not controlled to its optimum level since a masking effect is not utilized.

Also, a document titled "The critical band coder—digital encoding of the perceptual requirements of the auditory system" (M. A. Kransner MIT, ICASSP 1980) describes a technique in which auditory masking is used to obtain a signal-to-noise ratio necessary for each band, and fixed bit allocation is performed. According to this technique, bit allocation is fixed even when characteristics are measured with a sinewave input, which does not provide desired characteristic values.

In order to solve the above-described problems, there is proposed a highly efficient coding method in which all bits usable for bit allocation are divided into two: a pattern for predetermined fixed allocation to each band or each smaller-divided block formed by further dividing each band; and another pattern for bit allocation dependent on the magnitude of a signal in each block, and the division ratio is correlated to be dependent on a signal related to an input signal so that the ratio of the pattern for the fixed bit allocation is increased as the spectral distribution of the signal smooths.

According to the highly efficient coding method, when energy concentrates at particular spectral components such as a sinewave input, by allocating more bits to a block including the spectral components, total signal-to-noise characteristics can be remarkably improved. In general, the human sense of hearing is extremely sensitive to a signal with a sharp spectral distribution. Accordingly, using the highly efficient coding method to improve the signal-to-noise ratio is effective in improving not only a mere measured value but also a sound quality in the sense of hearing.

In addition to the above method, many other methods for bit allocation have been proposed. If a more precise model on the sense of hearing is made and the performance of a coding apparatus is improved, more highly efficient coding in the sense of hearing can be performed.

When the above-described DFT or DCT is used as a method for the spectral transformation of a waveform signal consisting of waveform elements (sample data) like a digital-audio signal in a time domain, a block is formed for, e.g., every M sample data, and spectral transformation (such as the DFT or the DCT) is performed with respect to each block. The spectral transformation of each block provides M independent real-number data (DFT-coefficient data or DCT-coefficient data). The M real-number data are coded by quantization to form coded data.

In order to reproduce a reproduction-waveform signal by decoding the coded data, first, the coded data are decoded so as to be reversely quantized. With respect to the obtained real-number data, reverse spectral transformation by a reverse DFT or reverse DCT is performed for each block corresponding to the block formed in coding, so that a waveform-element signal is obtained. And, the blocks including the waveform-element signal are connected.

In the formed reproduction-waveform signal a connection strain caused by the connection of the block remains, and is not desirable in the sense of hearing. Accordingly, in order to suppress the connection strain between the blocks, spectral transformation by the DFT or the DCT is performed in actual coding, while every $M_1$ sample data are overlapped in the adjacent blocks.

When spectral transformation is performed, with every $M_1$ sample data overlapped in the adjacent blocks, M real-number data are obtained on average for $(M-M_1)$ sample data. That is, the number of real-number data obtained by the spectral transformation increases more than the number of the original sample data used in the actual spectral transformation. Since the real-number data are subsequently coded by quantization, it is not preferable in coding efficiency that the number of the real-number data obtained by the spectral transformation increases more than the number of the original sample data.

To the contrary, when the above-described MDCT is used as a method for performing the spectral transformation of a waveform signal composed of sample data such as a digital-audio signal, in order to suppress a connection strain between blocks, spectral transformation is performed using 2M sample data formed by overlapping every M sample data in adjacent blocks so that M independent real-number data (MDCT-coefficient data) are obtained. Accordingly, the spectral transformation by the MDCT provides M real-number data with respect to M sample data on average, and enables coding whose efficiency is better than that of the spectral transformation using the DFT or the DCT.

When the spectral transformation by the MDCT is used to quantize the obtained real-number data, and the coded data formed by coding are decoded to generate a reproduction-waveform signal, the coded data are decoded so as to be reversely quantized, and reverse spectral transformation by the reverse MDCT is performed with respect to the obtained real-number data so that waveform elements in blocks are obtained. And, the waveform elements in the blocks are added so as to interfere mutually. Thereby, the waveform signal is reproduced.

$$x_{1,j}(n)=W_1(n)\times x(n+JM)$$

$$0\leqq n<2M \qquad (1)$$

$$X_J(k)=\frac{2}{M}\sum_{n=0}^{2M-1}x_{1,J}(n)\cos\left(\frac{\pi(2k+1)(2n+M+1)}{4M}\right) \qquad (2)$$

$$0\leq k<2M$$

where M represents a transformation length; J represents a process for the J-th block; (n+JM) means the (n+JM)-th input data from the beginning.

Equations (1) and (2) show MDCT-equations. The MDCT needs two processes: a window process expressed by Equation (1) and an MDCT-process expressed by Equation (2).

$$x_{2,J}(n)=\sum_{K=0}^{M-1}X_J(k)\cos\left(\frac{\pi(2k+1)(2n+M+1)}{4M}\right) \qquad (3)$$

$$0\leq n<2M$$

$$x_{3,j}(n)=w2(n)x_{2,j}(n)$$

$$0\leqq n<2M \qquad (4)$$

$$y(n+JM)=x_{3,J-1}(n+M)+x_{3,J}(n)$$

$$0\leqq n<M \qquad (5)$$

Equations (3) to (5) show reverse MDCT-equations. The reverse MDCT needs three processes: a reverse MDCT-process expressed by Equation (3); a window process expressed by Equation (4); and an overlapping process expressed by Equation (5).

$$w_1(n)w_2(n)+w_1(n+M)w_2(n+M)=1$$

$$0\leqq n<M \qquad (6)$$

$$w_1(2M-n-1)w_2(n+M)=w_1(M-n-1)w_2(n)$$

$$0\leqq n<M \qquad (7)$$

Equations (6) and (7) show binding conditions which must be satisfied by window functions used in the MDCT and the reverse MDCT in order to reproduce a waveform signal.

TABLE 1

| | | |
|---|---|---|
| Transformation length | 1024 | 256 |
| Number of logical-sum operations | 19968 | 4224 |
| Amount of necessary RAM | 1536 | 811 |

(word = 32 bits)

Table 1 shows the number of logical-sum operations in the reverse MDCT and the amount of necessary random access memory (RAM), obtained when the transformation length is 1024 or 256. The values of the amount of necessary RAM are required to perform floating-point arithmetics and to maintain a precision causing an error within ½ LSB in output 16-bit-PCM data. From Table 1 it is found that changing the transformation length from 1024 to 256 provides a decoding apparatus having a reverse-spectral-transformation circuit in which the number of logical-sum operations and the amount of necessary RAM decrease to 21% and 52%, respectively.

FIG. 5 shows a block diagram of a conventional signal-transmission apparatus 1 for transmitting an acoustic-waveform signal.

According to the signal-transmission apparatus 1 shown in FIG. 5, an acoustic-waveform signal inputted from an input terminal 11 is transformed by a spectral transformation circuit 12 from a time-axial signal to a frequency-axial spectral signal (signal-frequency components), and is subsequently normalized and quantized by a normalization/quantization circuit 14 using quantization-precision information found by a quantization-precision determination circuit 13.

The normalization/quantization circuit 14 outputs normalization-coefficient information and the coded spectral signal to a code-string generating circuit 15. The code-string generating circuit 15 generates a code string from the quantization-precision information, the normalization-coefficient information and the coded spectral signal, and outputs the code string from an output terminal 16. The outputted code string is recorded on a recording medium (not shown), or is transmitted to a transmission line.

FIG. 6 shows a specific block diagram of a case in which the MDCT is used as the transformation method in the spectral transformation circuit 12 shown in FIG. 5.

As shown in FIG. 6, an acoustic-waveform signal supplied from the input terminal 11 shown in FIG. 5 is inputted from a terminal 21. The acoustic-waveform signal is sent to a window-processing circuit 22, in which the window process expressed by Equation (1) is performed using a window coefficient supplied from an apparatus (not shown) via an input terminal 23. The window-processed signal outputted from the window-processing circuit 22 is transmitted to an MDCT circuit 24, in which the MDCT process expressed by Equation (2) is performed. A spectral signal outputted from the MDCT circuit 24 as the spectral signal from the spectral transformation circuit 12 is sent to the subsequent-stage circuit via a terminal 25.

The coding method performed in the signal-transmission apparatus shown in FIG. 5 will be described below, with reference to FIG. 7.

FIG. 7 shows the dB levels of the absolute values of the spectral signal (frequency components) obtained by the MDCT process. FIG. 7 also shows normalization-coefficient values in coded units.

64 spectral-signal components ES shown in FIG. 7 are obtained by using the spectral transformation circuit 12 to transform the acoustic-waveform signal for each predetermined-time frame. The 64 spectral-signal components ES are normalized and quantized by the normalization/quantization circuit 14, with the components separated into the groups (hereinafter referred to as "coded units") corresponding to five predetermined bands (Bands b1 to b5). For example, in Band b1 there are 8 spectral-signal components. Since the spectral-signal component of the lowest frequency is a maximum, it is selected as a normalization-coefficient value. Each spectral-signal component in the block is divided by the normalization-coefficient value, and its remainder is quantized.

The quantization-precision determination circuit 13 determines the quantization precision of each coded unit, based on e.g., an auditory model by calculating a minimum audible level or a masking level in the band corresponding to each coded unit. The band width of each coded unit is small in its low range and is large its high range, which can control the occurrence of quantization noise so as to adapt to auditory properties.

FIG. 8 shows an example of a code string generated by the signal-transmission apparatus shown in FIG. 5, and outputted from the terminal 16.

As shown in FIG. 8, the code string consists of five pieces U1 to U5 of coded-unit information. The five pieces of coded-unit information U1 to U5 consist of quantization-precision information, normalization-coefficient information, and pieces SC1 to SC8 of normalized and quantized signal-component information. The code string is recorded on a recording medium such as a magneto-optical disc. When quantization-precision information in one coded-unit information is zero as shown in coded-unit information U4, actual coding is not performed for the coded-unit information.

FIG. 9 shows a block diagram of a signal-reproduction apparatus that reproduces an acoustic-waveform signal from the information of the code string generated by the signal-transmission apparatus shown in FIG. 5, and outputs the reproduced signal.

As shown in FIG. 9, an input terminal 41 is supplied with a code string corresponding to the code string outputted from the terminal 16 shown in FIG. 5, and the supplied code string is inputted to a code-string decomposition circuit 42. The code-string decomposition circuit 42 extracts normalization-coefficient information, a spectral signal and quantization-precision information, and outputs them to a signal-component decoding circuit 43.

From the normalization-coefficient information, the spectral signal and the quantization-precision information, the signal-component decoding circuit 43 performs decoding to form a spectral signal corresponding to the spectral signal outputted from the spectral transformation circuit 12 shown in FIG. 5, and outputs the formed signal to a reverse-spectral-transformation circuit 44. The reverse-spectral-transformation circuit 44 generates an acoustic-waveform signal by performing a reverse-spectral-transformation process with a transformation length equal to that used by the spectral transformation circuit 12, and outputs the generated signal from an output terminal 45.

FIG. 10 shows a block diagram of a case in which the reverse MDCT is used as the reverse transformation method in the reverse-spectral-transformation circuit 44 shown in FIG. 9.

As shown in FIG. 10, the spectral signal supplied from the signal-component decoding circuit 43 via a terminal 51 is sent to a reverse-MDCT circuit 52, in which the reverse-MDCT expressed by Equation (3) is performed. A signal outputted form the reverse-MDCT circuit 52 is sent to a window-processing circuit 53, in which the window process expressed by Equation (4) is performed using a window coefficient supplied from an apparatus (not shown) via an input terminal 54. Thereby, when an overlapping process is performed by the subsequent overlapping circuit 55, data continues smoothly. A signal outputted from the window-processing circuit 53 is sent to the overlapping circuit 55, in which the overlapping process expressed by Equation (5) is performed. An acoustic-waveform signal outputted from the overlapping circuit 55, as the acoustic-waveform signal from the reverse-spectral-transformation circuit 44 shown in FIG. 9, is sent to the output terminal 45 via a terminal 56.

Incidentally, in order to reproduce only a signal having a narrow frequency band in the signal-reproduction apparatus 31, the signal-component decoding circuit 43 performs a decoding process for only signal blocks corresponding to a frequency band lower than a predetermined frequency, and does no t perform a decoding process for blocks corresponding to a higher frequency band. And, the reverse spectral transformation of the reproduced spectral signal is performed by the reverse-spectral-transformation circuit 44 with a transformation length equal to that used by the spectral transformation circuit 12.

In this case the size of the reverse-spectral-transformation circuit 44, occupying the whole signal-reproduction apparatus 31, is large similar to that of the signal-component decoding circuit 43. Accordingly, simply limiting the process of the signal-component decoding circuit 43 makes it impossible to form the signal-reproduction apparatus 31 which has an extremely small size.

SUMMARY OF THE INVENTION

Accordingly, it is an object of the present invention to provide a signal-reproduction apparatus having a size smaller than that of a conventional signal-reproduction apparatus.

To this end, according to a first aspect of the present invention, the foregoing object has been achieved through provision of a signal-reproduction method including the steps of: receiving a code string formed by coding a frequency-axial spectral signal obtained by performing the spectral transformation of a time-axial acoustic-waveform signal; decoding the received code string; and reproducing the acoustic-waveform signal by extracting part of the spectral signal and performing the reverse-spectral-transformation of the extracted part.

Preferably, low-frequency-band components are sequentially extracted from the spectral signal.

The length of the extracted part of the spectral signal may be set to 1/(2 to the power) of the length of the original spectral signal.

The spectral transformation may be a modified discrete cosine transform, and the reverse-spectral-transformation may be a reverse modified discrete cosine transform.

The reproduced acoustic-waveform signal may be oversampled.

According to another aspect of the present invention, the foregoing object has been achieved through provision of a signal-reproduction apparatus including: reception means for receiving a code string formed by coding a frequency-axial spectral signal obtained by performing the spectral transformation of a time-axial acoustic-waveform signal; extraction means for extracting part of the spectral signal from the received code string; and transformation means for performing the reverse spectral transformation of the extracted part of the spectral signal.

Preferably, the length of the extracted part of the spectral signal is set to 1/(2 to the power) of the length of the original spectral signal.

The spectral transformation may be a modified discrete cosine transform, and the reverse-spectral-transformation may be a reverse modified discrete cosine transform.

The signal-reproduction apparatus further includes oversampling means for oversampling the reproduced acoustic-waveform signal.

According to the present invention, a code string formed by coding frequency components obtained by spectral formation with a first transformation length is received, and reverse spectral formation of the received string is performed with a second transformation length shorter than the first transformation length. Thus, a small-sized signal-reproduction apparatus is realized.

DESCRIPTION OF THE PREFERRED EMBODIMENT

A preferred embodiment of the present invention will be described with reference to the attached drawings.

Figure 1:
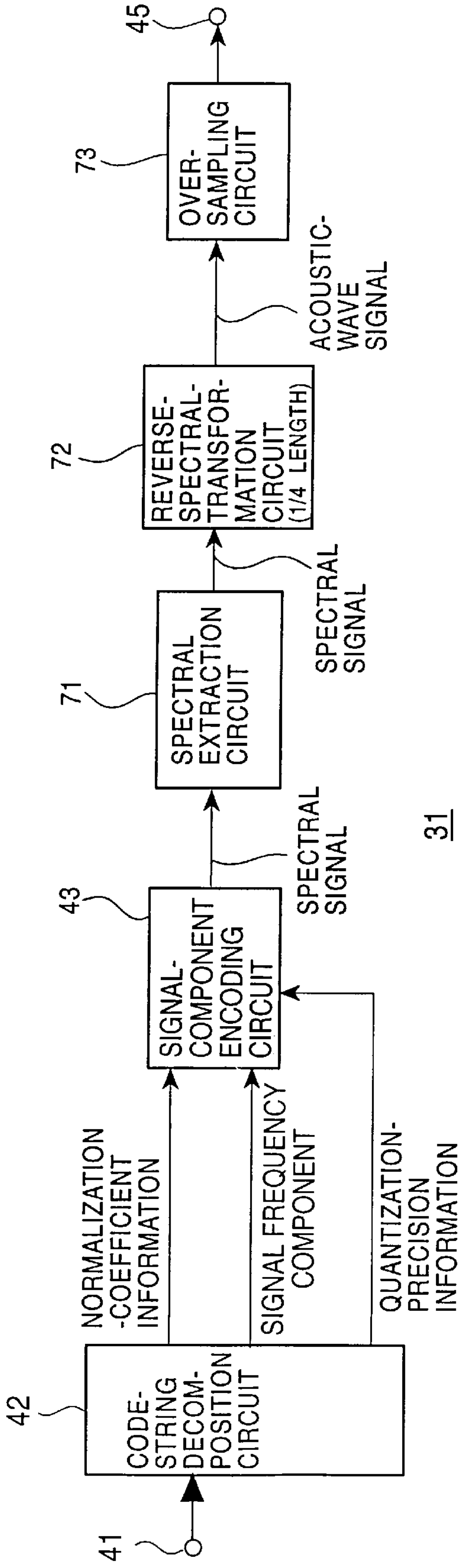
FIG. 1 is a block diagram showing a signal-reproduction apparatus according to an embodiment of the present invention.

FIG. 1 shows a block diagram of a signal-reproduction apparatus according to an embodiment of the present invention.

Figure 9:
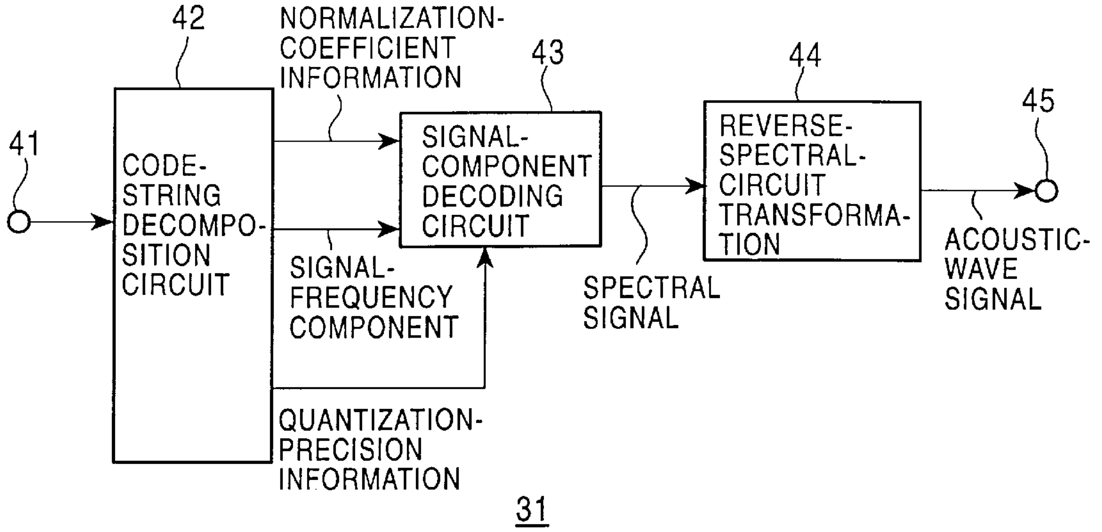
FIG. 9 (PRIOR ART)
FIG. 9 is a block diagram showing a conventional signal-reproduction apparatus.
Figure 10:
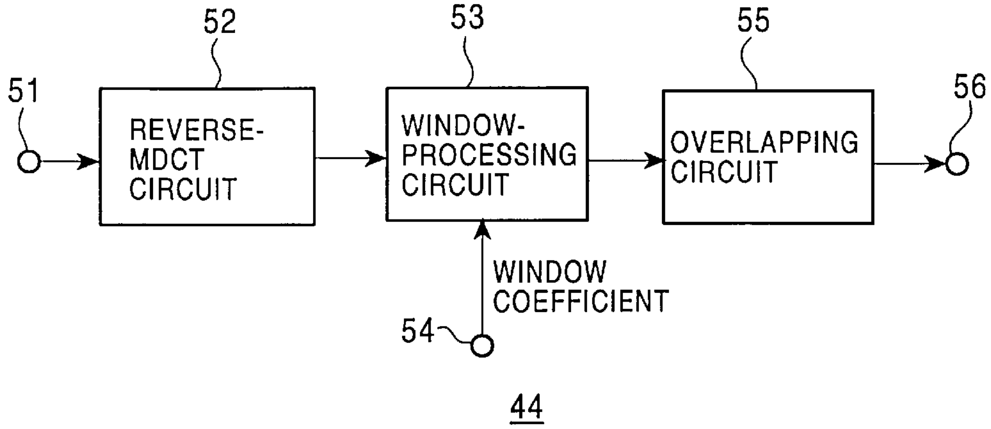
FIG. 10 (PRIOR ART)
FIG. 10 is a block diagram showing a reverse-spectral-transformation circuit shown in FIG. 9.

In the signal-reproduction apparatus 31, the output of a signal-component decoding circuit 43 is supplied to a spectral extraction circuit 71 (extraction means), in which a spectral signal having a predetermined frequency band is extracted. The output of the spectral extraction circuit 71 is supplied to a reverse-spectral-transformation circuit 72. The reverse-spectral-transformation circuit 72 generates an acoustic-waveform signal by performing a reverse-spectral-transformation process with respect to data having a transformation length which is ¼ of the transformation length used in the spectral transformation circuit 12 shown in FIG. 5, and outputs it to an oversampling circuit 73. The oversampling circuit 73 oversamples the inputted acoustic-waveform signal at a rate of 4 times, and outputs the increased signal from an output terminal 45. Other components are similar to the case shown in FIG. 9.

Figure 2A:
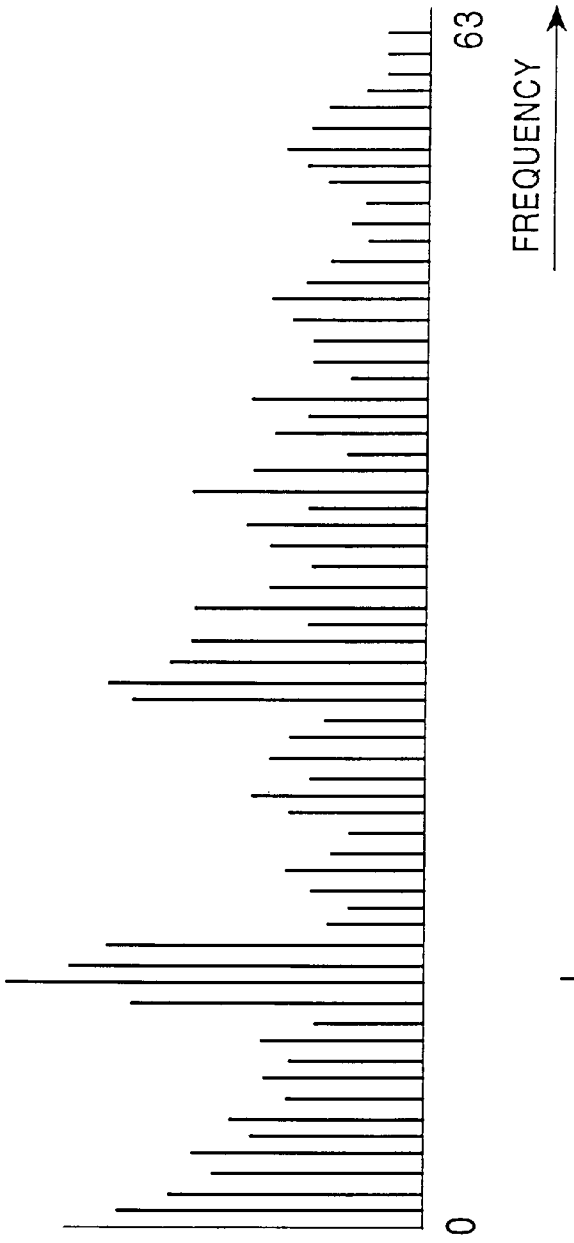
FIGS. 2A and 2B are graphs illustrating a process performed by a spectral extraction circuit shown in FIG. 1.
Figure 5:
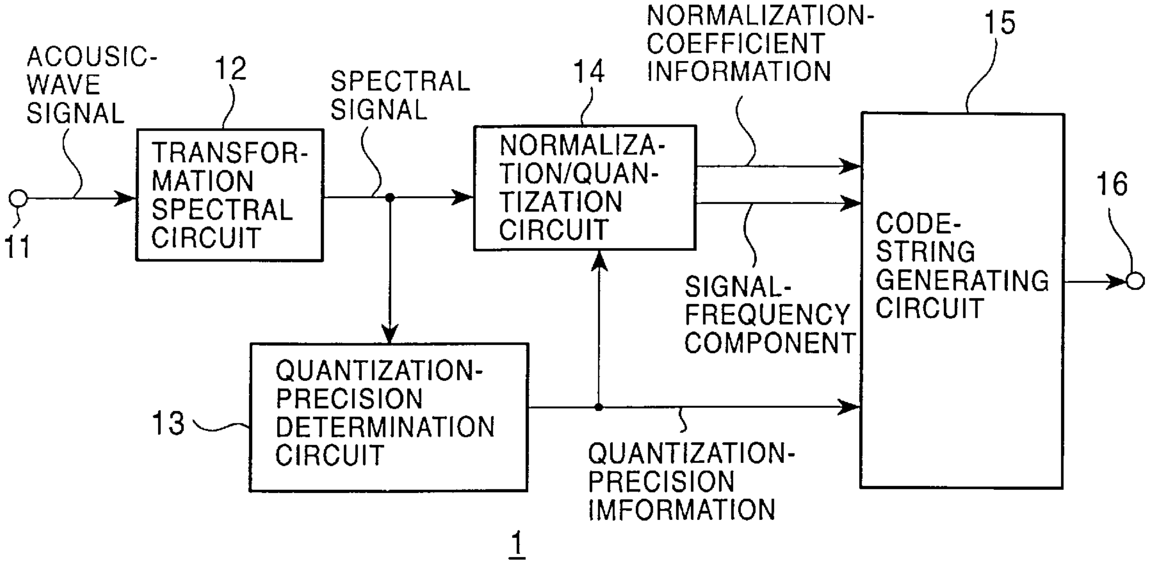
FIG. 5 (PRIOR ART)
FIG. 5 is a block diagram showing an example of a conventional signal-transformation apparatus.
Figure 6:
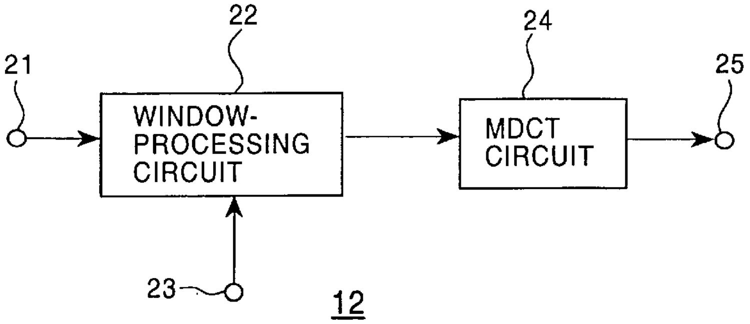
FIG. 6 (PRIOR ART)
FIG. 6 is a block diagram showing a spectral transmission circuit shown in FIG. 5.
Figure 7:
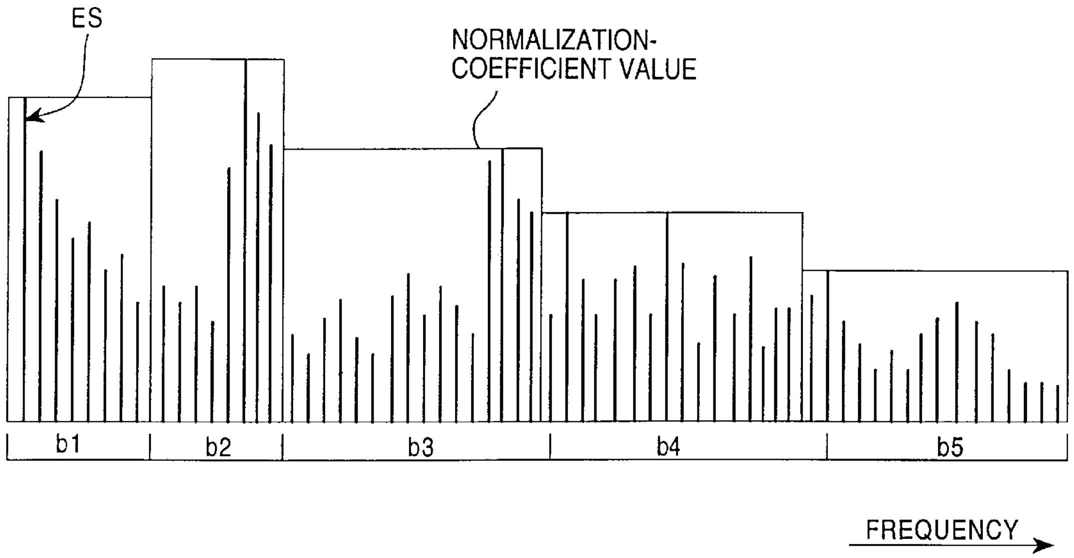
FIG. 7 (PRIOR ART)
FIG. 7 is a chart showing an example of a coded unit in a frame.
Figure 8:
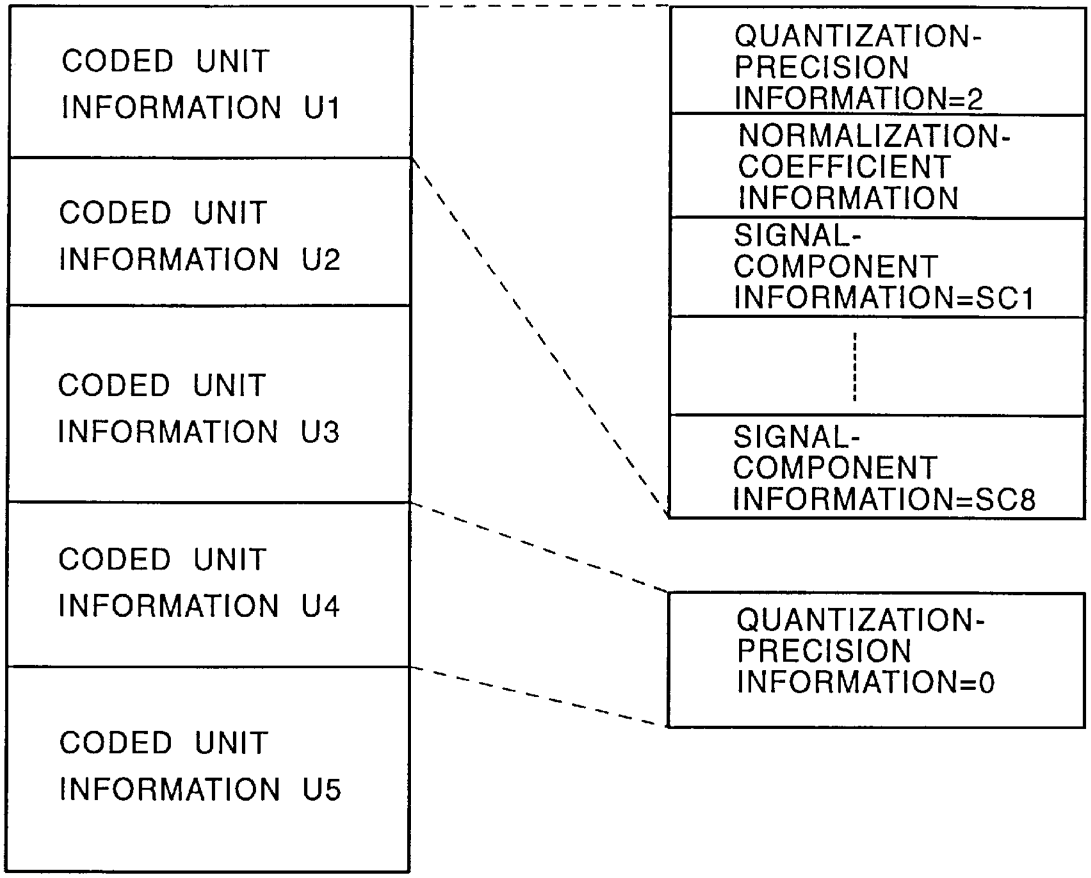
FIG. 8 (PRIOR ART)
FIG. 8 is a chart showing a code string obtained by coding by a conventional signal-transformation apparatus.

The operation of the signal-reproduction apparatus 31 will be described below. A signal inputted from a terminal 41 is decomposed by a code-string decomposition circuit 42 (reception means) into normalization-coefficient information, a spectral signal, and quantization-precision information. The signal-component decoding circuit 43 decodes the spectral signal correspondingly to the normalization-coefficient information and the quantization-precision information, and outputs the decoded signal to the spectral extraction circuit 71. In this manner, for example, if the transformation length used by the spectral transformation circuit 12 shown in FIG. 5 is 64, a spectral signal shown in FIG. 2A is inputted to the spectral extraction circuit 71.

The spectral extraction circuit 71 extracts from a low range only part of the spectral signal having transformation lengths corresponding to ¼ of the overall 64 transformation lengths. In other words, from among spectral-signal components having 64 transformation lengths denoted by numbers 0 to 63 from the low range in FIG. 2A, the spectral-signal components corresponding to transformation lengths denoted by low-range numbers 1 to 16 as shown in FIG. 2A are extracted. In other words, the spectral extraction circuit 71 performs an operation of the following formula (8) to extract $X'_J(k)$ from an inputted spectral signal $X_J(k)$, and output it.

$$X'_J(k)=X_J(k)$$

$$0 \leq k < M' \tag{8}$$

where M'=M/4

The reverse-spectral-transformation circuit 72 performs a process reverse to the process performed by the spectral transformation circuit 12 shown in FIG. 5, with respect to the spectral-signal components corresponding to 16 transformation lengths. Specifically, IMDCT operations expressed by the following formulae (9) to (11) are performed.

$$x_{2,J}(n) = \sum_{k=0}^{M'-1} X'_J(k)\cos\left(\frac{\pi(2k+1)(2n+M'+1)}{4M'}\right) \tag{9}$$

$$0 \leq n < 2M'$$

$$x_{3,J}(n)=w_2(n)x_{2,J}(n)$$

$$0 \leq n < 2M' \tag{10}$$

$$y(n+JM')=x_{3,J-1}(n+M')+x_{3,j}(n)$$

$$0 \leq n < M' \tag{11}$$

where M'=M/4.

The transformation length used by the reverse-spectral-transformation circuit 72 is set to ¼ of the transformation length used by the spectral transformation circuit 12. Thus, compared with the case that the transformation length used by the reverse-spectral-transformation circuit 12 is set to 1, the size of the reverse-spectral-transformation circuit 72 can be reduced.

Figure 3:
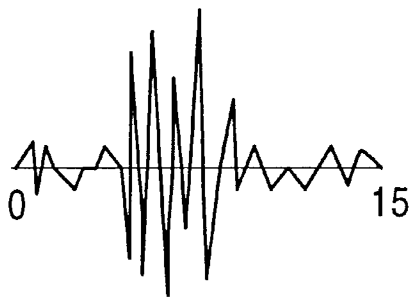
FIG. 3 is a graph demonstrating the output of a reverse-spectral-transformation circuit shown in FIG. 1.
Figure 4:
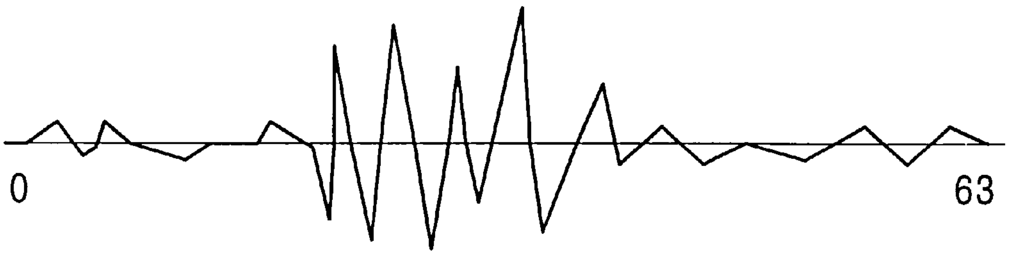
FIG. 4 is a graph demonstrating the output of a reverse-spectral-transformation circuit shown in FIG. 9.

The transformation length (used by the reverse-spectral-transformation circuit 72 ) which is set to ¼ of that used by the spectral transformation circuit 12 causes a sampling rate for an acoustic-waveform signal (shown in FIG. 3) outputted by the reverse-spectral-transformation circuit 72 to be ¼ of the sampling rate for the acoustic-waveform signal (shown in FIG. 4) outputted by the reverse-spectral-transformation circuit 44. Even if an acoustic-waveform signal outputted from the output terminal 45 is supplied to a digital-to-analog (D/A) converter (not shown), which outputs a signal at ¼ of the sampling rate by converting the supplied signal from digital to analog form, the output of the reverse-spectral-transformation circuit 72 may be supplied unchanged to the D/A converter when the outputted signal can be converted from digital to analog form. However, when the D/A converter requires that the sampling rate be 1, the oversampling circuit 73 oversamples the acoustic-waveform signal outputted from the reverse-spectral-transformation circuit 72 at a rate of 4 times.

For example, if the frequency band defined by 64 transformation lengths, shown in FIG. 2A, is 48 kHz, a sound signal having a frequency up to its half, 24 kHz, can be theoretically reproduced. However, in the embodiment shown in FIG. 1, ¼ of the frequency band (namely, a band of 12 kHz) is used as the transformation length, a sound signal having a frequency up to 6 kHz can be theoretically reproduced. Although the sound quality deteriorates in reproduction for the amount, the size of the whole signal-reproduction apparatus 31 can be reduced as described.

In addition, it is found that the sound quality does not deteriorate as previously expected. In other words, conventionally thinking that a sound quality will be impractical unless a transformation length in decoding is set equal to that in coding is, so to speak, technical common sense. (Thus, conventionally, even when only part of frequency-band components is decoded, reverse spectral transformation is performed at the same transformation length by the reverse-spectral-transformation circuit 44.) Nevertheless, experiments conducted by the present inventors have shown that a sufficiently practical sound quality can be preserved.

In the above embodiment of the present invention the transformation length is set to ¼, however, it may be set to 1/(2 to the power), such as ½ and ⅛. Although the transformation length may be set to, e.g., ¾ and the like, the use of such a value may cause a case in which the size of the reverse-spectral-transformation circuit 72 cannot be efficiently reduced. In other words, the fast Fourier-transform process is performed by the reverse-spectral-transformation circuit 72 when an IMDCT process is performed, and the fast Fourier-transform process is performed in units of the power of 2. Thus, by setting the transformation length in units of the power of 2, the size of the reverse-spectral-transformation circuit 72 can be securely reduced.

Figure 2B:
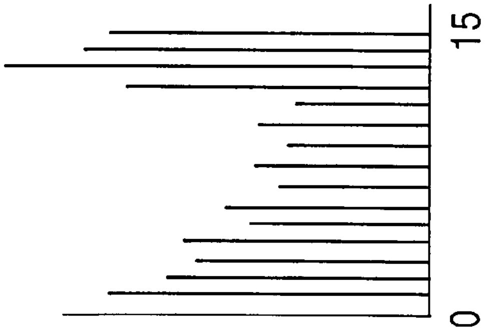

In the above embodiment, as shown in FIGS. 2A and 2B, from the spectral-signal components denoted by numbers 0 to 63, the low-range, sequential spectral-signal components denoted by numbers 0 to 15 are extracted by the spectral extraction circuit 71. Instead, 16 middle-range or high-range spectral-signal components may be extracted. Also, spectral-signal components may be periodically extracted at a rate of 1 per 4 components, or 10 low-range components and the other 6 components may be extracted from an arbitrary band.

In the above embodiment the spectral transformation is performed by the MDCT. Instead, another method may be employed.

Furthermore, when a signal-component-decoding process is performed by the signal-component decoding circuit 43, it is possible that decoding is performed with respect to only blocks of a signal in a frequency band lower than a predetermined frequency so that the decoding is not performed with respect to blocks corresponding to signal components in a higher frequency band. This enables a reduction in the size of the signal-component decoding circuit 43 itself. As a result, a combination of the signal-component decoding circuit 43 and the reverse-spectral-transformation circuit 72 reduces the whole size of the signal-reproduction apparatus 31.

On the other hand, the present invention may be applied to not only the decoding of an audio signal but also the decoding of a video signal.

What is claimed is:

1. A signal-reproduction method comprising the steps of:

receiving a code string formed by coding a frequency-axial spectral signal obtained by performing a spectral transformation of a time-axial acoustic-waveform signal;

decoding the received code string;

extracting a part of said spectral signal from the decoded received code string, wherein said part comprises less than all of said spectral signal; and reproducing said acoustic-waveform signal by performing a reverse-spectral-transformation of the extracted part with a transform length corresponding to a length of said extracted part.

2. A signal-reproduction method according to claim 1, wherein said extracted part comprises low-frequency-band components of said spectral signal.

3. A signal-reproduction method according to claim 1, wherein said length of the extracted part is set to 1/(2 to the power) of a length of said spectral signal.

4. A signal-reproduction method accordinding to claim 1, wherein said spectral transformation is a modified discrete cosine transform, and said reverse-spectral-transformation is a reverse modified discrete cosine transform.

5. A signal-reproduction method according to claim 1, wherein the reproduced acoustic-waveform signal is oversampled.

6. A signal-reproduction method according to claim 3, wherein low-frequency-band components are sequentially extracted from said spectral signal.

7. A signal-reproduction method according to claim 3, wherein said spectral transformation is a modified discrete cosine transform, and said reverse-spectral-transformation is a reverse modified discrete cosine transform.

8. A signal-reproduction method according to claim 3, wherein the reproduced acoustic-waveform signal is oversampled.

9. A signal-reproduction apparatus including:

reception means for receiving a code string formed by coding a frequency-axial spectral signal obtained by performing a spectral transformation of a time-axial acoustic-waveform signal;

extraction means for extracting a part of said spectral signal from the received code string, wherein said part comprises less than all of said spectral signal; and transformation means for performing a reverse spectral transformation of the extracted part with a transform length corresponding to a length of said extracted part.

10. A signal-reproduction apparatus according to claim 6, wherein said length of the extracted part is set to 1/(2 to the power) of a length of said spectral signal.

11. A signal-reproduction apparatus according to claim 9, wherein said spectral transformation is a modified discrete cosine transform, and said reverse-spectral-transformation is a reverse modified discrete cosine transform.

12. A signal-reproduction apparatus according to claim 9, wherein said signal-reproduction apparatus further includes oversampling means for oversampling the reverse transformed extracted part.

13. A signal-reproduction apparatus according to claim 10, wherein said spectral transformation is a modified discrete cosine transform, and said reverse-spectral transformation is a reverse modified discrete cosine transform.

14. A signal-reproduction apparatus according to claim 10, wherein said signal-reproduction apparatus further includes oversampling means for oversampling the reverse transformed extracted part.

15. A signal-reproduction apparatus including:

a code string decomposition circuit configured to receive a code string formed by coding a frequency-axial spectral signal obtained by performing a spectral transformation of a time-axial acoustic-waveform signal;

a spectral extraction circuit configured to extract a part of said spectral signal from the received code string, wherein said part comprises less than all of said spectral signal; and a reverse-spectral-transformation circuit configured to perform a reverse spectral transformation of the extracted part with a transform length corresponding to a length of said extracted part.

16. A signal-reproduction apparatus according to claim 15, wherein said length of the extracted part is set to 1/(2 to the power) of a length of said spectral signal.

17. A signal-reproduction apparatus according to claim 15, wherein said spectral transformation is a modified discrete cosine transform, and said reverse-spectral transformation is a reverse modified discrete cosine transform.

18. A signal-reproduction apparatus according to claim 15, wherein said signal-reproduction apparatus further includes an oversampling circuit configured to oversample the reverse transformed extracted part.

* * * * *